(No Model.)

J. RINGEN.
HANDLE FOR BUCKETS, &c.

No. 331,447. Patented Dec. 1, 1885.

Attest:
F. A. Hopkins
Edward Stein

Inventor:
Jno Ringen
By Knight Bro's
attys.

UNITED STATES PATENT OFFICE.

JOHN RINGEN, OF ST. LOUIS, MISSOURI.

HANDLE FOR BUCKETS, &c.

SPECIFICATION forming part of Letters Patent No. 331,447, dated December 1, 1885.

Application filed August 1, 1885. Serial No. 173,243. (No model.)

*To all whom it may concern:*

Be it known that I, JOHN RINGEN, of the city of St. Louis, in the State of Missouri, have invented a certain new and useful Improvement in Handles for Buckets and other Receptacles, of which the following is a full, clear, and exact description, reference being had to the accompanying drawings, forming part of this specification, and in which—

Figure 1:
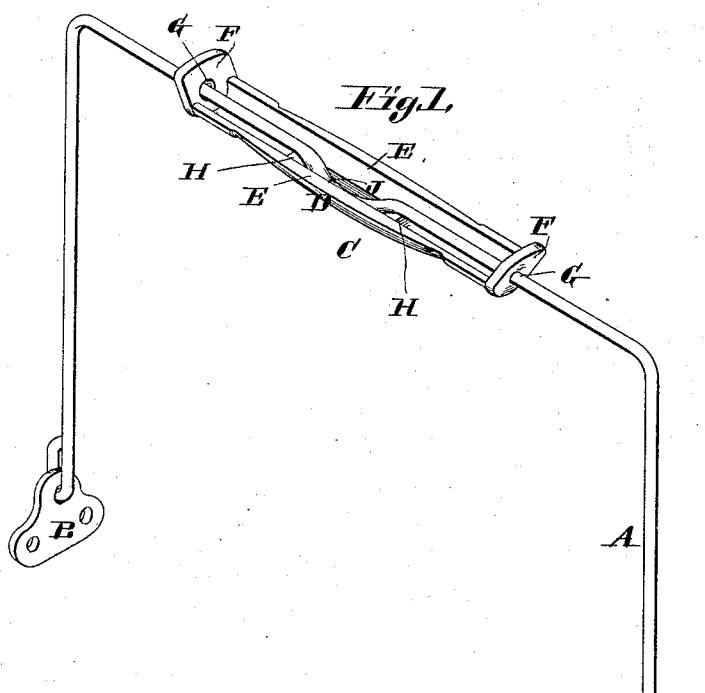
Figure 2:
Figure 3:
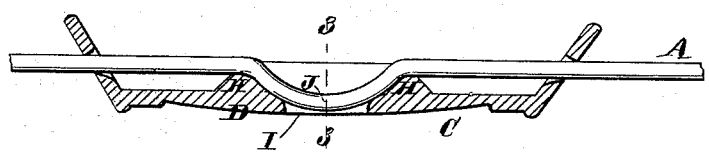

Figure 1 is a perspective view of my improved handle, showing it secured in place on a bail of a bucket or other receptacle. Fig. 2 is a longitudinal section taken on line 2 2, Fig. 3, showing part of the bail and the handle secured thereto. Fig. 3 is a transverse section taken on line 3 3, Fig. 2.

My invention relates to an improved handle for use on buckets and other receptacles; and my invention consists in features of novelty hereinafter fully described, and pointed out in the claims.

Referring to the drawings, A represents a bail provided with ears B, by which it may be attached to a bucket or any receptacle.

C represents my improved handle, consisting of a body, D, having upturned sides E and ends F, with perforations G. The sides form a trough, through which the bail passes, extending through the perforations, as shown in Figs. 1 and 2. The body has raised portions or projections H, between which it is open at I, as shown. When the handle is put in place, the central portion, J, of the bail is bent down between these projections into the opening I, thus preventing either end or lateral movement of the handle upon the bail. The lower surface of the handle is rounding or convex, so as to form a smooth surface for the hand.

A handle thus made can be cast in one piece, so as to be produced cheaply, and when placed upon the bail and the bail pressed down in the center, as described, it (the handle) is held securely in place and not permitted to move either endwise or laterally.

I claim as my invention—

1. In combination with a bail, the improved handle consisting of a body with upturned sides and perforated upturned ends, substantially as and for the purpose set forth.

2. In combination with a bail, the improved handle consisting of the body D, upturned sides E, perforated ends F, and projections H, the bail being bent at J into an opening, I, of the handle, substantially as shown and described, for the purpose set forth.

3. In combination with a bail, the handle having perforated ends through which the bail passes, and an opening or recess into which the bail is pressed to prevent the handle from moving thereon, substantially as shown and described.

JOHN RINGEN.

Witnesses:
SAML. KNIGHT,
GEO. H. KNIGHT.